United States Patent
Neuner et al.

(10) Patent No.: US 6,669,568 B1
(45) Date of Patent: Dec. 30, 2003

(54) TORQUE CONVERTER COUPLING

(75) Inventors: Josef Neuner, Raubling (DE); Roland Gollmer, Dachau (DE); Karl-Heinz Hodermann, Neufahrn (DE); Marco Noack, Unterschleissheim (DE); Renate Walk, Salem (DE); Wolfgang Kundermann, Schweinfurt (DE)

(73) Assignees: Bayerische Motoren Werke AG, Munich (DE); Mannesmann Sachs AG, Schweinfurt (DE); ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/049,997
(22) PCT Filed: Jul. 21, 2000
(86) PCT No.: PCT/EP00/07017
§ 371 (c)(1), (2), (4) Date: Jun. 25, 2002
(87) PCT Pub. No.: WO01/14768
PCT Pub. Date: Mar. 1, 2001

(30) Foreign Application Priority Data

Aug. 20, 1999 (DE) .......... 199 39 527

(51) Int. Cl.$^7$ .............................. F16D 3/58
(52) U.S. Cl. ............ 464/75; 192/209; 464/89; 464/901; 464/903
(58) Field of Search ............... 192/70.17, 209; 464/74, 75, 87, 89, 150, 180, 903, 181, 901

(56) References Cited

U.S. PATENT DOCUMENTS

| | | | | |
|---|---|---|---|---|
| 4,252,226 A | * | 2/1981 | Staub, Jr. ................. | 192/209 |
| 4,252,227 A | * | 2/1981 | Staub, Jr. ................. | 192/209 |
| 4,291,790 A | * | 9/1981 | Staub, Jr. ................. | 192/3.28 |
| 5,024,120 A | * | 6/1991 | Andra ..................... | 74/574 |
| 5,186,292 A | * | 2/1993 | Hageman et al. ......... | 192/3.28 |
| 5,383,540 A | * | 1/1995 | MacDonald ............. | 192/3.29 |
| 6,283,262 B1 | * | 9/2001 | Yamamoto ............... | 192/3.29 |
| 2001/0001768 A1 | | 5/2001 | Kundermann | |

FOREIGN PATENT DOCUMENTS

| | | |
|---|---|---|
| DE | 7725998 | 2/1979 |
| DE | 3822637 | 1/1990 |
| DE | 3809797 A1 | 10/1998 |
| DE | 19747962 A1 | 5/1999 |
| DE | 19848253 A1 | 8/1999 |
| EP | 0431242 B1 | 6/1991 |
| FR | 2150000 | 3/1973 |
| GB | 1396173 | 6/1975 |

* cited by examiner

Primary Examiner—Lynne H. Browne
Assistant Examiner—Kenn Thompson
(74) Attorney, Agent, or Firm—Crowell & Moring LLP

(57) ABSTRACT

A driving coupling for the torque transmission in the transmission line of a motor vehicle includes a shaft-hub coupling provided with longitudinal toothings for the releasable coupling of a crankshaft with a coaxially arranged hydrodynamic torque converter. The longitudinal toothings of the shaft-hub coupling have tooth cross-sections which become larger and smaller respectively in the longitudinal direction of the teeth. An elastomer layer is situated at least between the tooth flanks of the shaft and the hub which transmit the torque.

27 Claims, 1 Drawing Sheet

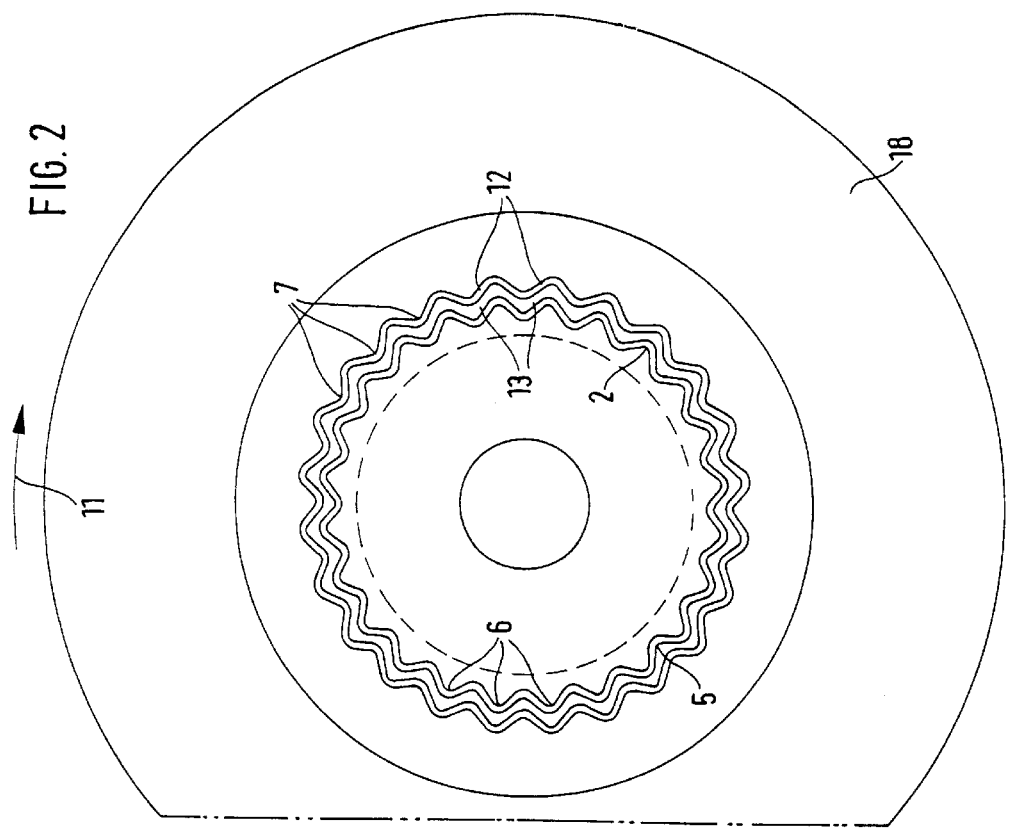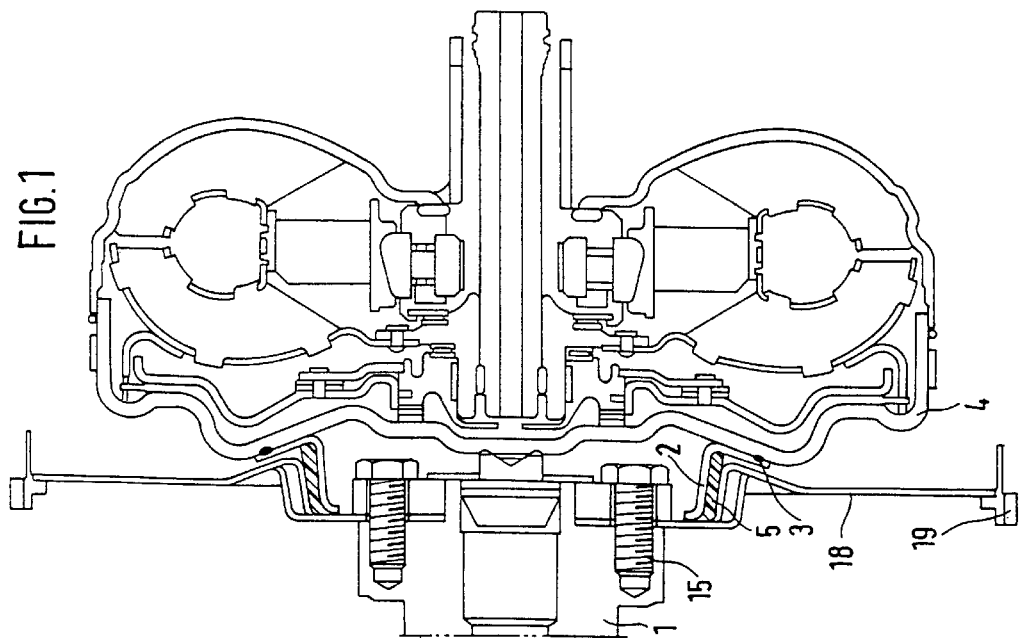

TORQUE CONVERTER COUPLING

BACKGROUND AND SUMMARY OF THE INVENTION

The invention relates to a torque converter coupling to a crankshaft in the transmission line of a motor vehicle and a method of coupling a torque converter to a crankshaft.

It is known to provide, in the transmission line of a motor vehicle, a driving coupling for the torque transmission by means of a shaft-hub coupling provided with longitudinal toothings, for a releasable coupling of a crankshaft with a hydrodynamic torque converter arranged in a coaxial manner. The longitudinal toothings of the shaft-hub coupling have tooth cross-sections which become larger and smaller respectively in the longitudinal direction of the teeth.

German Patent Document DE 197 47 962 A1 describes such a driving coupling for torque transmission. It was found that, because of the requirement of the self-locking of the driving coupling against releasing forces during torque transmission, the tooth flanks of the tooth cross-sections which become larger and smaller respectively must be made in a very precise manner, resulting in high manufacturing costs. In addition, as a result of misalignments between the torque converter and the crankshaft result in a poor contact pattern of the tooth flanks, which is always disadvantageous during torque transmission.

It is therefore an object of the invention to provide a releasable coupling between a torque converter and a crankshaft which can be established easily and compensates misalignments with zero backlash.

According to the invention, a driving coupling is provided in the transmission line of a motor vehicle for torque transmission by means of a shaft-hub coupling. The shaft-hub coupling has longitudinal toothings for a releasable coupling of a crankshaft with a hydrodynamic torque converter arranged in a coaxial manner. The longitudinal toothings of the shaft-hub coupling have tooth cross-sections which become larger and smaller respectively in the longitudinal direction of the teeth. The driving coupling has an elastomer layer situated at least between the tooth flanks of the shaft and the hub.

Such a longitudinal toothing with an elastomer layer between the shaft and the hub has the advantage that zero backlash is created in the case of an axial prestressing even when misalignments occur between the crankshaft and the torque converter. In addition, in the case of a coupling between a crankshaft and a hydrodynamic torque converter arranged coaxially, a good contact pattern is achieved by means of such a shaft-hub coupling, even in the case of an external centering.

In a preferred embodiment of the invention, the elastomer layer is applied to the shaft toothing and/or to the hub toothing. This has the advantage that the shaft-hub coupling can be produced in a simple manner, particularly if the elastomer layer is vulcanized onto the toothing.

An advantageously cost-effective variant of the driving coupling is characterized in that the longitudinal toothings of the shaft-hub coupling are shaped of sheet metal.

If the tooth cross-sections, which become larger and smaller respectively in the longitudinal direction of the teeth, are achieved by way of such a change of the tooth width of the longitudinal toothings of the shaft-hub coupling, a relatively large change of the tooth cross-section is possible as a result of the high coefficient of friction between the elastomer and the steel. This results in zero backlash even in the case of small axial tolerances. Preferably, a wedge angle of the widening or narrowing teeth from 8 to 15 degrees may be provided.

In another advantageous embodiment of the invention, an axial force is used for the axial fixing of the shaft-hub coupling, which axial force is generated by an internal converter pressure during the operation of the converter.

Such a construction has the advantage that no additional measures have to be taken for axially securing the shaft-hub coupling. The axial force in the direction of the crankshaft generated on the basis of the torque converter operation presses the conical longitudinal toothings into one another without backlash as a result of the elastomer layer.

In addition, for the axial fixing of the shaft-hub coupling, the shaft and the hub can also be form-lockingly connected with one another in a form locking manner. This ensures the coupling between the crankshaft and the torque converter even when the torque converter is not in operation and therefore no internal converter pressure is present. Such a form-locking coupling of the shaft and the hub is achieved by known machine elements, such as a tension spring mounted in a circumferential groove of the hub, or screws screwed in the radial direction into the hub and projecting through the latter.

A preferred embodiment of the invention is described in the following description with the pertaining drawing.

BRIEF DESCRIPTION OF THE DRAWINGS

FIG. 1 is a partial sectional view of the coupling of a crankshaft to a torque converter according to the invention; and FIG. 2 is a cross-sectional view of the coupling of the crankshaft to the torque converter of FIG. 1 in the area of the toothing.

DETAILED DESCRIPTION OF THE DRAWINGS

FIG. 1 is a view of an end section of a crankshaft 1 having a carrier metal sheet 18 for a starter gear ring 19, which carrier metal sheet 18 is fastened by screws 15. In a certain diameter range, the carrier metal sheet 18 is constructed as a longitudinally toothed hub which forms a releasable driving coupling with a driving flange 2 of a hydrodynamic torque converter constructed as a longitudinally toothed shaft. The hub and the shaft mesh with one another in a form-locking manner.

By means of a weld seam 3, the driving flange 2 is fixedly connected with a housing 4 of the torque converter. The driving flange 2 and the carrier metal sheet 18 are made of sheet metal. Their longitudinal toothings have tooth cross-sections which become larger and smaller respectively in the longitudinal direction of the teeth 6, 7 (FIG. 2). An elastomer layer 5, which is vulcanized either to the carrier metal sheet 18 or to the driving flange 2, is situated between the teeth 6, 7.

The housing 4 is axially displaceable with respect to the crankshaft 1. As a result, the internal converter pressure occurring during the operation of the torque converter displaces the housing 4 with the driving flange 2 in the direction of the crankshaft 1, specifically until the shaft hub coupling has zero backlash because of the tooth cross-sections on the shaft and the hub and because of the elastomer layer 5. This means that the driving flange 2 is supported by the crankshaft 1 in the axial direction by way of the longitudinal toothing.

FIG. 2 is a cross-sectional view of the longitudinal toothings of the carrier metal sheet 18 as the hub and of the driving flange 2 as the shaft. They are shaped of metal and, as a result of the pushing into one another of the crankshaft 1 and the driving flange 2, are connected with one another in a form locking manner. The elastomer layer 5 is situated between the teeth 6, 7 of the toothing of the carrier metal sheet 18 and that of the driving flange 2. When the crankshaft 1 rotates in the direction marked by the arrow 11 and torque is transmitted from the carrier metal sheet 18 to the driving flange 2, the force transmission takes place by way of the tooth flanks 12 of the teeth 7 and the elastomer layer 5 to the tooth flanks 13 of the teeth. As a result of the tooth cross-sections because of the elastomer layer 5, and because of the internal converter pressure, which axially loads the driving flange 2 in the direction of the crankshaft 1, zero backlash occurs at the force-transmitting tooth flanks 12, 13 of the releasable driving coupling. Even in the event of sudden increases of load or load fluctuations, the axial force from the internal converter pressure ensures that a separation of the tooth flanks 12 of the carrier metal sheet 18 and of the tooth flanks 13 of the driving flange 2 is prevented.

In another embodiment, which is not shown, it is also conceivable that the longitudinal toothing is replaced by wedge-shaped claws of radial serrations, which claws project into one another. The wedge angle of the claws should then be approximately within the range of the self-locking limit. The elastomer layer will then correspondingly be applied between the claws.

What is claimed is:

1. Driving coupling for torque transmission in the transmission line of a motor vehicle by means of a shaft-hub coupling provided with longitudinal toothings for a releasable coupling of a crankshaft with a hydrodynamic torque converter arranged in a coaxial manner, the longitudinal toothings of the shaft-hub coupling having tooth cross-sections which become larger and smaller respectively in the longitudinal direction of the teeth wherein an elastomer layer is situated at least between the tooth flanks of the shaft and the hub.

2. Driving coupling according to claim 1, wherein the elastomer layer is applied to at least one of the shaft toothing and the hub toothing.

3. Driving coupling according to claim 1, wherein the elastomer layer is vulcanized on the at least one of shaft toothing and hub toothing.

4. Driving coupling according to claim 1, wherein the longitudinal toothings of the shaft-hub coupling are shaped of sheet metal.

5. Driving coupling according to claim 1, wherein the tooth cross-sections are achieved by means of such a change of the tooth width of the longitudinal toothings of the shaft-hub coupling which, during the torque transmission, is self-locking with respect to a releasing force.

6. Driving coupling according to claim 1, wherein, for the axial fixing of the shaft-hub coupling, an axial force is used which is generated by an internal converter pressure during the operation of the torque converter.

7. Driving coupling according to claim 2, wherein the tooth cross-sections are achieved by means of such a change of the tooth width of the longitudinal toothings of the shaft-hub coupling which, during the torque transmission, is self-locking with respect to a releasing force.

8. Driving coupling according to claim 3, wherein the tooth cross-sections are achieved by means of such a change of the tooth width of the longitudinal toothings of the shaft-hub coupling which, during the torque transmission, is self-locking with respect to a releasing force.

9. Driving coupling according to claim 2, wherein, for the axial fixing of the shaft-hub coupling, an axial force is used which is generated by an internal converter pressure during the operation of the torque converter.

10. Driving coupling according to claim 3, wherein, for the axial fixing of the shaft-hub coupling, an axial force is used which is generated by an internal converter pressure during the operation of the torque converter.

11. Driving coupling according to claim 5, wherein, for the axial fixing of the shaft-hub coupling, an axial force is used which is generated by an internal converter pressure during the operation of the torque converter.

12. A driving coupling for coupling a torque converter to a crankshaft, the driving coupling comprising:

a shaft coupling having longitudinal teeth, the shaft coupling being connected to one of the torque converter and the crankshaft;

a hub coupling having longitudinal teeth, the hub coupling being connected to the other of the torque converter and the crankshaft, wherein the longitudinal teeth of the shaft coupling are engageable with the longitudinal teeth of the hub coupling; and an elastomer layer positioned between tooth flanks of the shaft coupling and tooth flanks of the hub coupling.

13. A driving coupling according to claim 12, wherein the elastomer layer is applied to at least one of the longitudinal teeth of the shaft coupling and the longitudinal teeth of the hub coupling.

14. A driving coupling according to claim 13, wherein the elastomer layer is vulcanized on the at least one of the longitudinal teeth of the shaft coupling and the longitudinal teeth of the hub coupling.

15. A driving coupling according to claim 13, wherein the longitudinal teeth of the shaft and hub couplings are shaped of sheet metal.

16. A driving coupling according to claim 13, wherein the longitudinal teeth of the shaft and hub couplings are configured in a manner so that they are engaged in a self-locking manner when they are engaged.

17. A driving coupling according to claim 16, wherein in operation an axial force, generated by an internal converter pressure, is used to engage the shaft and hub couplings.

18. A driving coupling according to claim 12, wherein the longitudinal teeth of the shaft and hub couplings are configured in a manner so that they are engaged in a self-locking manner when they are engaged.

19. A driving coupling according to claim 18, wherein in operation an axial force, generated by an internal converter pressure, is used to engage the shaft and hub couplings.

20. A driving coupling according to claim 13, wherein in operation an axial force, generated by an internal converter pressure, is used to engage the shaft and hub couplings.

21. A driving coupling according to claim 12,
wherein in operation an axial force, generated by an internal converter pressure, is used to engage the shaft and hub couplings.

22. A method of coupling a torque converter to a crankshaft, the method comprising:
coupling longitudinal teeth of a shaft coupling connected to one of the torque converter and the crankshaft to longitudinal teeth of a hub coupling connected to the other of the torque converter and the crankshaft, wherein an elastomer layer is positioned between tooth flanks of the shaft coupling and tooth flanks of the hub coupling.

23. A method according to claim 22, comprising applying the elastomer layer to at least one of the longitudinal teeth of the shaft coupling and the longitudinal teeth of the hub coupling.

24. A method according to claim 23, comprising vulcanizing the elastomer layer on the at least one of the longitudinal teeth of the shaft coupling and the longitudinal teeth of the hub coupling.

25. A method according to claim 22, comprising shaping the longitudinal teeth of the shaft and hub couplings from sheet metal.

26. A method according to claim 22, comprising configuring the longitudinal teeth of the shaft and hub couplings in a manner so that they are engaged in a self-locking manner when they are engaged.

27. A method according to claim 22, comprising, in operation, using an axial force, generated by an internal converter pressure, to engage the shaft and hub couplings.

* * * * *